(12) United States Patent
Ha (10) Patent No.: US 11,867,449 B2
(45) Date of Patent: Jan. 9, 2024

(54) REFRIGERATOR

(71) Applicant: LG Electronics Inc., Seoul (KR)

(72) Inventor: Kyungho Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 17/459,198

(22) Filed: Aug. 27, 2021

(65) Prior Publication Data

US 2022/0090843 A1 Mar. 24, 2022

(30) Foreign Application Priority Data

Sep. 22, 2020 (KR) ........................ 10-2020-0122485

(51) Int. Cl.
| | | |
|---|---|---|
| *F25D 23/02* | (2006.01) | |
| *E05B 1/00* | (2006.01) | |
| *A01N 25/08* | (2006.01) | |
| *A01N 59/06* | (2006.01) | |
| *A01N 59/16* | (2006.01) | |

(52) U.S. Cl.
CPC ............ *F25D 23/02* (2013.01); *A01N 25/08* (2013.01); *A01N 59/16* (2013.01); *E05B 1/0069* (2013.01); *F25D 23/028* (2013.01); *F25D 2323/021* (2013.01); *F25D 2400/18* (2013.01)

(58) Field of Classification Search
None
See application file for complete search history.

(56) References Cited

U.S. PATENT DOCUMENTS

| | | | | | |
|---|---|---|---|---|---|
| 4,011,898 | A | * | 3/1977 | Hubbard | A45C 7/0077 383/17 |
| 4,775,585 | A | * | 10/1988 | Hagiwara | A01N 59/20 264/210.4 |
| 4,906,464 | A | * | 3/1990 | Yamamoto | A61K 33/06 424/688 |
| 4,923,450 | A | * | 5/1990 | Maeda | A61M 25/0017 523/122 |
| 4,938,955 | A | * | 7/1990 | Niira | A01N 59/16 424/688 |

(Continued)

FOREIGN PATENT DOCUMENTS

| | | | |
|---|---|---|---|
| CN | 110214790 A | * | 9/2019 |
| CN | 110477012 A | * | 11/2019 |

(Continued)

OTHER PUBLICATIONS

Office Action in Korean Appln. No. 10-2020-0122485, dated Oct. 10, 2022, 15 pages (with English translation).

(Continued)

*Primary Examiner* — Hanh V Tran
(74) *Attorney, Agent, or Firm* — Fish & Richardson P.C.

(57) ABSTRACT

A refrigerator includes a cabinet configured to define a storage space, a door configured to open and close the storage space. The door includes an outer plate configured to define an outer appearance of a front surface of the door, a door liner configured to define a rear surface of the door, and a decor member configured to connect the outer plate to the door liner. The decor member includes an inorganic antibacterial agent including a metal component having antibacterial properties and a carrier on which the metal component is supported.

15 Claims, 5 Drawing Sheets

(56) References Cited

U.S. PATENT DOCUMENTS

| | | | | |
|---|---|---|---|---|
| 5,102,401 | A * | 4/1992 | Lambert | A61L 33/0011 604/264 |
| 5,180,585 | A * | 1/1993 | Jacobson | D01F 6/62 424/490 |
| 5,290,544 | A * | 3/1994 | Shimono | A61K 8/19 424/618 |
| 5,305,827 | A * | 4/1994 | Steele | F28F 13/04 106/15.05 |
| 5,562,872 | A * | 10/1996 | Watanabe | A47J 47/005 264/331.16 |
| 5,697,203 | A * | 12/1997 | Niwa | B65B 31/08 99/477 |
| 5,714,430 | A * | 2/1998 | Gehrer | C08K 9/12 502/344 |
| 5,714,445 | A * | 2/1998 | Trinh | A61L 15/46 510/438 |
| 5,766,611 | A * | 6/1998 | Shimono | A61K 8/0241 424/641 |
| 6,444,726 | B1 * | 9/2002 | Brunt | C09D 5/025 424/405 |
| 6,655,765 | B2 * | 12/2003 | Kawamura | E05B 17/0033 312/405 |
| 7,984,955 | B2 * | 7/2011 | Jung | F25D 23/028 312/319.2 |
| 8,074,468 | B2 * | 12/2011 | Yoo | F25D 25/025 62/440 |
| 8,424,985 | B2 * | 4/2013 | Kwon | F25D 23/02 312/405 |
| 10,006,691 | B2 * | 6/2018 | Jung | E05D 7/00 |
| 11,337,421 | B2 * | 5/2022 | Ahari | B29C 48/10 |
| 11,464,347 | B2 * | 10/2022 | Oh | A47F 3/0434 |
| 2013/0047656 | A1 * | 2/2013 | Kang | F25D 23/028 62/389 |
| 2014/0139091 | A1 * | 5/2014 | Oh | F25D 23/02 312/405.1 |
| 2016/0117022 | A1 * | 4/2016 | Kim | H03K 17/9643 345/82 |
| 2018/0149420 | A1 * | 5/2018 | Lee | H05K 5/0017 |
| 2018/0266751 | A1 * | 9/2018 | Lim | F25D 23/028 |
| 2018/0372394 | A1 * | 12/2018 | Kim | F25D 29/005 |
| 2019/0032994 | A1 * | 1/2019 | Choi | A47F 3/0434 |
| 2019/0086141 | A1 * | 3/2019 | Kim | F25D 23/028 |
| 2019/0099510 | A1 * | 4/2019 | Furudate | C01G 23/002 |
| 2019/0257571 | A1 * | 8/2019 | Park | F25D 23/02 |
| 2022/0095627 | A1 * | 3/2022 | Ko | A01N 59/16 |

FOREIGN PATENT DOCUMENTS

| | | | |
|---|---|---|---|
| CN | 111269026 | A * | 6/2020 |
| CN | 111296479 | A * | 6/2020 |
| JP | 2002003239 | | 1/2002 |
| JP | 3949657 | | 7/2007 |
| JP | 2008544953 | A * | 12/2008 |
| JP | 2019529711 | A * | 10/2019 |
| KR | 19990020148 | | 3/1999 |
| KR | 101564098 | | 10/2015 |
| KR | 20160136151 | | 11/2016 |
| KR | 20170071039 | | 6/2017 |
| WO | WO-2015178166 A1 * | | 11/2015 |

OTHER PUBLICATIONS

Notice of Allowance in Korean Appln. No. 10-2020-0122485, dated May 12, 2022, 4 pages (with English translation).

* cited by examiner

REFRIGERATOR

CROSS-REFERENCE TO RELATED APPLICATION

This application claims priority under 35 U.S.C. § 119 to Korean Patent Application No. 10-2020-0122485, filed on Sep. 22, 2020. The disclosure of the prior application is incorporated by reference in its entirety.

TECHNICAL FIELD

The present disclosure relates to a refrigerator.

BACKGROUND ART

In general, a refrigerator is a home appliance that has a storage space shielded by a door to store food at a low temperature, and cools air by using a refrigerant cycle to circulate the cooled air inside the storage space, thereby storing the food in the storage space under an optimal condition.

Such refrigerators tend to increase more and more in size and provide multi-functions due to the trends of change of dietary life and high quality, and accordingly, refrigerators provided with various structures and convenience devices in consideration of user convenience are being released and developed.

When the refrigerator is used, it is easy for microorganisms or bacteria to inhabit through the user's body contact. Particularly, since there are many cases in which hands touched with the food are in contact with a door handle, or hands touched with the door handle touches the food, the microorganisms or the bacteria may be transplanted into the food stored in the refrigerator.

Korean Patent Registration No. 10-1564098 discloses a storage unit for a refrigerator including an antibacterial coating layer that contains an encapsulated antibacterial material to extract sterilization and antibacterial functions, and a method for manufacturing the same.

However, the related art has a limitation in that it is relatively unprotected by microorganisms or bacteria, although it is easily contaminated by the bacteria due to frequent contact with users in a process of using the refrigerator, e.g., a door handle and a display portion.

DISCLOSURE OF THE INVENTION

Technical Problem

Embodiments provide a refrigerator, in which a decor member configured to connect an outer plate defining a front surface of a door to a door liner defining a rear surface of the door contains an antibacterial material to improve an antibacterial function of the refrigerator.

Technical Solution

In one embodiment, a refrigerator includes an inorganic antibacterial agent including an outer plate defining a front surface of a door and a carrier, in which metal ions are supported on a decor member connecting an internal insulating material, to improve antibacterial performance.

In another embodiment, a refrigerator includes: a cabinet configured to define a storage space; a door configured to open and close the storage space, wherein the door includes: an outer plate configured to define an outer appearance of a front surface of the door; a door liner configured to define a rear surface of the door; and a decor member configured to connect the outer plate to the door liner, wherein the decor member includes an inorganic antibacterial agent including a metal component having antibacterial properties and a carrier on which the metal component is supported.

The decor member may include one or more of: an upper decor configured to define a top surface of the door; a lower decor configured to define a bottom surface of the door; and a side frame configured to define each of both side surfaces of the door.

The decor member may include a door handle portion provided by recessing one surface of the decor member.

The metal component may include one or more components selected from the group consisting of silver (Ag), zinc (Zn), copper (Cu), manganese (Mn), mercury (Hg), tin (Sn), lead (Pb), cadmium (Cd), chromium (Cr), titanium (Ti), cobalt (Co), palladium (Pd), platinum (Pt), and gold (Au).

The carrier may include one or more components selected from the group consisting of zeolite, zirconium phosphate, apatite, glass and silica.

The inorganic antibacterial agent may include about 0.1% by weight to about 15% by weight of the metal component based on 100% by weight of the inorganic antibacterial agent comprising the metal component and the carrier.

The inorganic antibacterial agent may include about 0.1% by weight to about 5% by weight of a silver (Ag) component based on 100% by weight of the inorganic antibacterial agent.

The inorganic antibacterial agent may have a mean particle diameter of about 1 μm to about 100 μm. The inorganic antibacterial agent may be contained at a content of about 0.01% by weight to 5% by weight based on 100% by weight of an injection product forming the decor member.

The decor member may contain a silver (Ag) component at a content of about 200 mg/kg to about 350 mg/kg.

The outer plate may be made of a metal material, and the decor member may be made of a plastic material.

The refrigerator may further include a display portion configured to display an operation condition or operation state of the refrigerator at one side of the front surface of the door, wherein the inorganic antibacterial agent may be contained in the display portion.

The inorganic antibacterial agent may include: a primary carrier on which the metal component is supported; and a secondary carrier on which the primary carrier is supported.

Each of the primary carrier and the secondary carrier may include one or more components selected from the group consisting of zeolite, zirconium phosphate, apatite, glass and silica.

Advantageous Effects

According to the refrigerator according to the embodiment, the refrigerator including the antibacterial material having the antibacterial performance in the decor member that is in frequent contact with the user's body to improve the antibacterial properties.

In addition, according to the embodiment, the antibacterial material may contain the metal ions to kill the bacteria through the contact with the metal ions, thereby improving the antibacterial properties and the hygiene.

In addition, the antibacterial material according to an embodiment of the present invention, including metal ions in a supported state on the carrier, can stably control the content of metal ions eluted from the decor member. Therefore, there may be the advantage of securing the safety due to the metal ions.

BEST MODE FOR CARRYING OUT THE INVENTION

Hereinafter, detailed embodiments will be described in detail with reference to the accompanying drawings. However, the scope of the present disclosure is not limited to proposed embodiments of the present invention, and other regressive inventions or other embodiments included in the scope of the spirits of the present disclosure may be easily proposed through addition, change, deletion, and the like of other elements.

Figure 1:
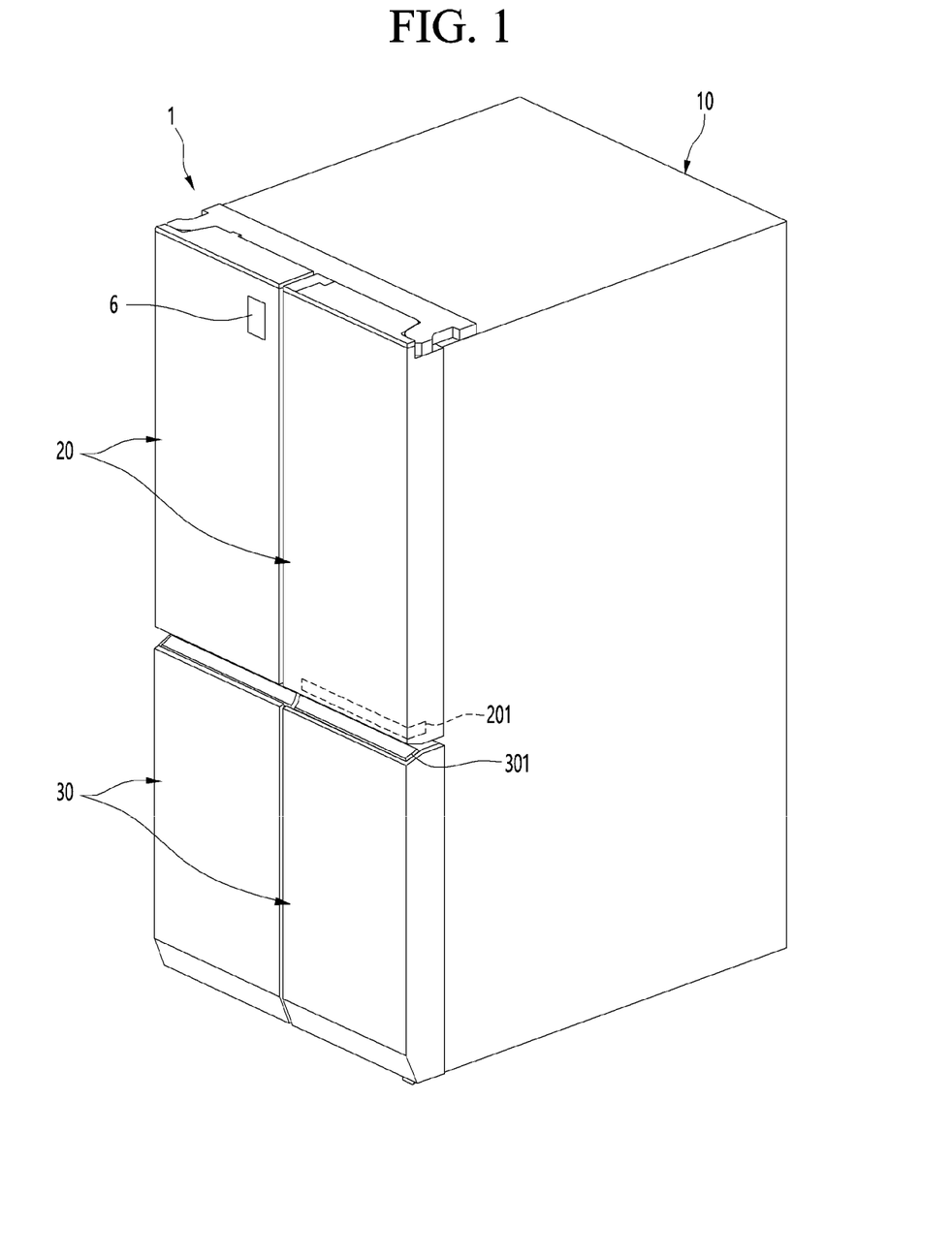
FIG. 1 is a perspective view illustrating an outer appearance of a refrigerator according to an embodiment.
Figure 2:
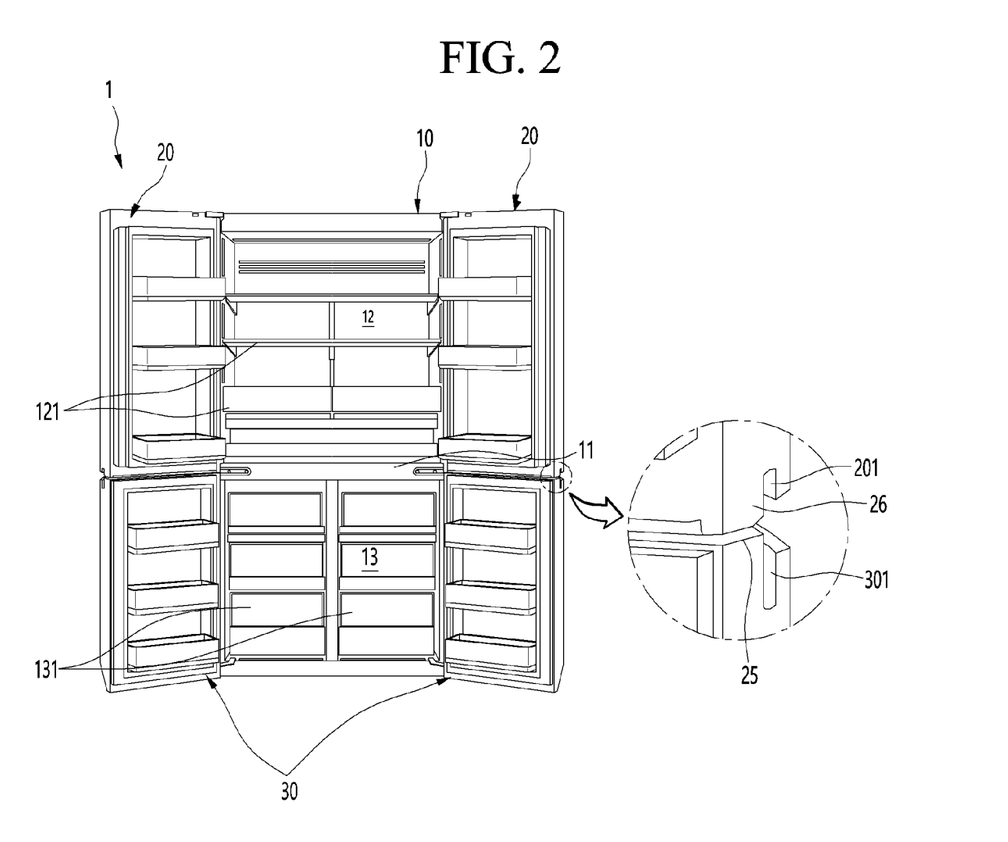
FIG. 2 is a front view illustrating the inside of the refrigerator.
Figure 3:
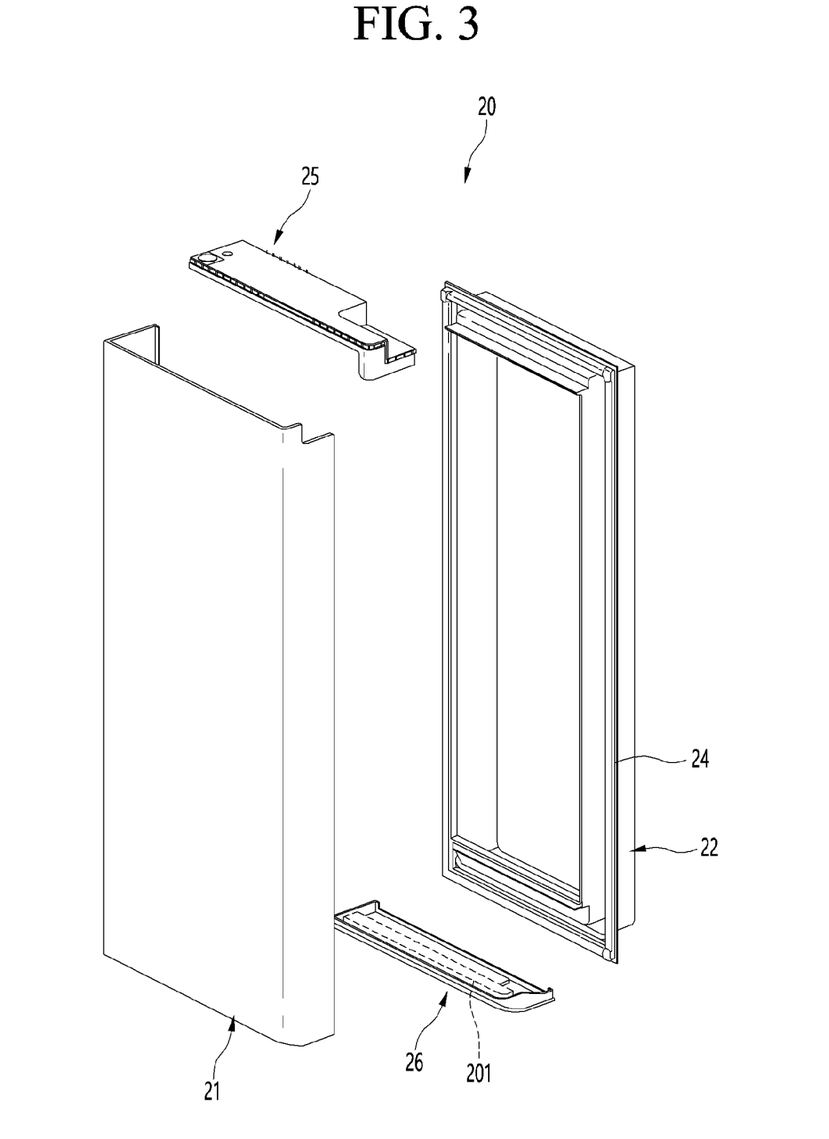
FIG. 3 is an exploded perspective view of a door.

FIG. 1 is a perspective view illustrating an outer appearance of a refrigerator according to an embodiment. Also, FIG. 2 is a front view illustrating the inside of the refrigerator according to an embodiment. Also, FIG. 3 is an exploded perspective view illustrating a door.

As illustrated in the drawings, an outer appearance of a refrigerator 1 according to an embodiment may be defined by a cabinet 10 defining a storage space and a door that opens and closes the storage space. The inside of the cabinet 10 is partitioned into upper and lower portions by a barrier 11. A refrigerating compartment 12 may be defined in the upper portion of the cabinet 10, and a freezing compartment 13 may be defined in the lower portion of the cabinet 10.

Also, various accommodation members 121 such as shelves, drawers, or baskets may be provided in the refrigerating compartment 12. The storage member 121 may be inserted and withdrawn in a state in which the door is opened if necessary, and food may be accommodated and stored by inserting and withdrawing the storage member 121.

The door may include a refrigerating compartment door 20 and a freezing compartment door 30. The refrigerating compartment door 20 may be opened and closed by rotating an opened front surface of the refrigerating compartment 12, and the freezing compartment door 30 may be opened and closed by rotating an opened front surface of the freezing compartment 13. Also, the refrigerator compartment door 20 and the freezing compartment door 30 are provided in pair at left and right sides to shield the freezing compartment 13 and the freezing compartment 13, respectively.

A plurality of door baskets may be provided in the refrigerating compartment door 20 and the freezing compartment door 30, and the door basket may be configured so as not to interfere with the accommodation members 121 and 131 provided in the refrigerator in the state in which the refrigerating compartment 20 and the freezing compartment 30 are closed.

When viewed in the front, the refrigerating compartment door 20 and the freezing compartment door 30 may define the overall outer appearance and be made of a metal material so that the whole of the refrigerator has a texture of the metal material.

Although a bottom freezer type refrigerator in which, the freezing compartment is provided at the lower portion, is described as an example in this embodiment, the present disclosure may be applied to all types of refrigerators including a door without being limited to the types of refrigerators.

An outer appearance of each of the doors 20 and 30 may be defined by an outer plate 21 made of a metal material, a door liner 22 coupled to the outer plate 21, and upper and lower cap decors 25 and 26, which are disposed on upper and lower ends of the door liner 22.

The outer plate 21 may be made of a plate-shaped stainless material and be bent to define a front surface of the door 20 and a portion of a circumferential surface of the door 20.

Also, the door liner 22 may be injection-molded using a plastic material to define a rear surface of the door 40. Also, a rear gasket 24 may be provided around a circumference of a rear surface of the door liner 22. The rear gasket 24 is in close contact with a circumference of the cabinet 10 to prevent cold air from leaking between the door 20 and the cabinet 10. Here, the door liner 22 may also be referred to as a decor member.

The cap decors 25 and 26 define a top surface and a bottom surface of the door 20, respectively, and a hinge mounting portion for allowing the door 20 to be rotatably mounted on the cabinet 10 may be provided on each of the cap decors 25 and 26.

Also, a door handle portion 201 may be provided by being recessed from the bottom surface of the door 20, i.e., the lower cap decor 26, and a user may put his/her hands into the door handle portion 201 to rotatably manipulation the door 20, thereby opening and closing the refrigerating compartment 12.

Also, the door handle portion 301 recessed downward may also be provided in the upper cap decor 25 defining a top surface of the freezing compartment door 30. The user may put his/her hands into the door handle portion 301 to rotatably manipulate the freezing compartment door 30, thereby opening and closing the freezing compartment 13.

In a state in which the outer plate 21, the door liner 22, and the cap decor 25 and 26 are coupled to each other, a foaming liquid may be filled in an inner space of the door 20 to provide an insulating material. That is, the insulating material is disposed in the door 20 to insulate the inner space and an outside space of the refrigerator from each other.

In other words, a space defined by the outer plate 21 and the insulating material may be shielded by the cap decors 25 and 26. Each of the cap decors may also be referred to as a decor member. Also, the door handle portions 201 and 301 provided on the cap decors may also be referred to as decor members in this embodiment.

An inorganic antibacterial agent, which will be described later, may be provided on the cap decor. That is, the inorganic antibacterial agent may be injected into or applied to the cap decor, and thus, when microorganisms or bacteria are present on the cap deco, the microorganisms or the bacteria may be killed by the inorganic antibacterial agent.

Thus, the inorganic antibacterial agent may be provided on the decor member, of which top, bottom, and both side surfaces are defined by connecting the door handle portions 201 and 301, which are in frequent contact with the user's body, the door outer plate 21, and the door liner 22 to each other to effectively prevent contamination from occurring by the microorganisms or the bacteria.

A display portion 6 may be provided at one side of the front surface of the door 20. The display portion 6 may display operation conditions or state information that shows an operation state of the refrigerator, or may include a manipulation portion for inputting the operation conditions or state conditions of the refrigerator.

In detail, the display portion 6 may be displayed as a design or a numeral or character using 88 segments. An operation condition input portion may include an input button in the form of a touch sensor, and a character indicating the operation condition may be displayed below the touch sensor. Thus, a portion of the touch sensor may be touched to set the operation condition of the refrigerator, for example, a temperature of the refrigerating compartment or the freezing compartment.

Also, a display cover for preventing the display portion 6 from being contaminated by external contaminants may be provided on the display portion 6. In addition, the display cover may be made of a plastic material or a film. The display cover may also be referred to as a decor member in the present disclosure.

The inorganic antibacterial agent according to an embodiment may be provided on the display cover. Thus, the display cover may be contaminated by the microorganisms or the bacteria due to the frequent contact with the user's hands, but the inorganic antibacterial agent may be provided on the display cover to kill the microorganisms or the bacteria, thereby improving the antimicrobial properties.

Figure 4:
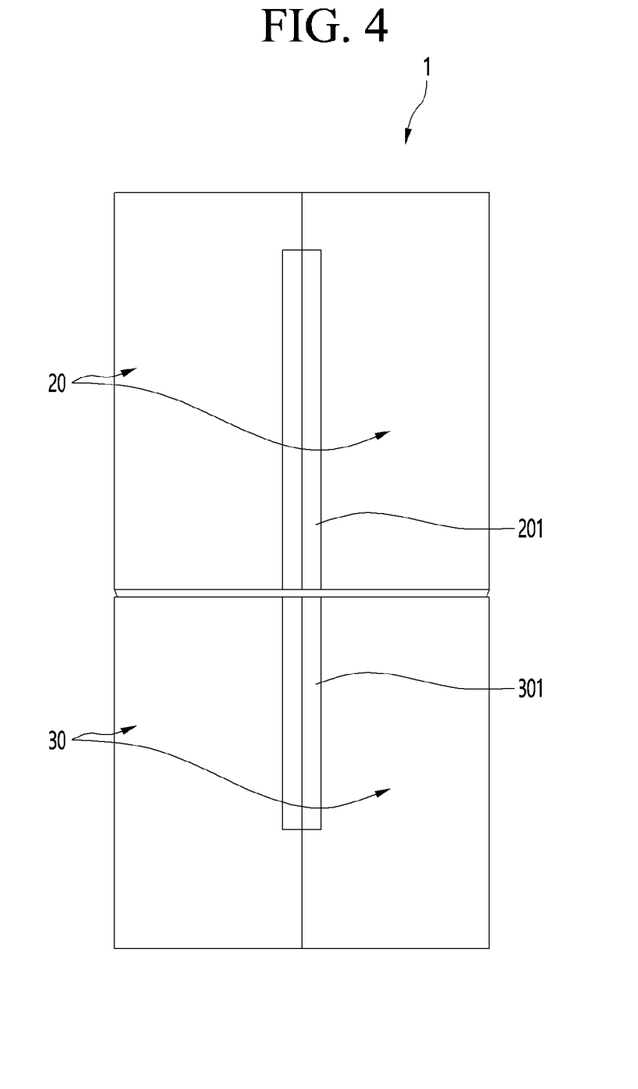
FIG. 4 is a perspective view illustrating an outer appearance of a refrigerator according to another embodiment.

FIG. 4 is a perspective view illustrating an outer appearance of a refrigerator according to another embodiment.

A refrigerator according to another embodiment may include a refrigerating compartment door 20 that opens and closes a refrigerating compartment and a freezing compartment door 30 that opens and closes a freezing compartment and also may include door handle portions 201 and 301 that are capable of opening and closing the doors by inserting a user's hand at side surfaces of the doors 20 and 30.

Referring to FIG. 4, the refrigerator according to another embodiment may include the door handle portions 201 and 301 in which the side surfaces of the doors 20 and 30 are recessed so that a user grip the door handle portions 201 and 301.

In detail, each of the refrigerating compartment door 20 and the freezing compartment door 30 may include an outer plate defining an outer appearance of the door and a door liner defining a rear surface of the door and also may include a decor member connecting the outer plate to the door liner and defining top, bottom, and both side surfaces of the door.

Also, the door handle portions 201 and 301 that are recessed so that the user's hand is put may be provided on the decor member defining on side surface of both the side surface of the doors 20 and 30.

Also, the decor member or the door handle portion may include an inorganic antibacterial agent according to an embodiment.

Figure 5:
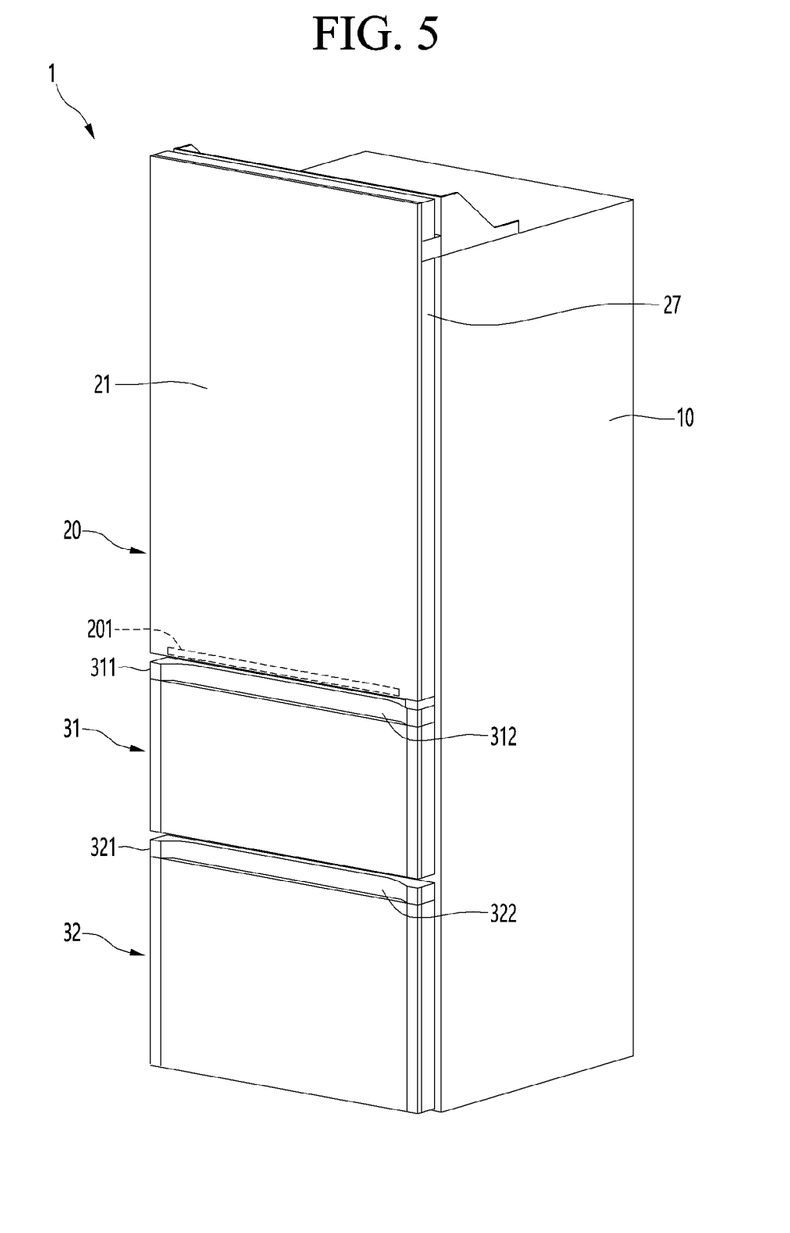
FIG. 5 is a perspective view illustrating an outer appearance of a refrigerator according to further another embodiment.

FIG. 5 is a perspective view illustrating an outer appearance of a refrigerator according to further another embodiment.

Referring to the FIG. 5, an overall outer appearance of a refrigerator according to a further embodiment may be defined by a cabinet 10 defining a storage space having an opened front surface and doors 20 and 30 that open and close the storage space.

Also, in the refrigerator 1, the doors 20, 31, and 32 may be disposed vertically. The door 20 that is opened and closed in a rotatable manner may be provided at an upper side, and the doors 31 and 32 that are opened and closed in a slidable manner may be provided at a lower side.

In detail, a hinge may be provided at one side of each of upper and lower ends of the upper door 20 and be rotatably mounted to the cabinet 10.

Also, the lower door 30 may be inserted and withdrawn in a drawer type to open and close the lower storage space and may be provided in plurality.

Outer appearances of front surfaces of each of the upper door 20 and the lower doors 31 and 32 may be defined by the outer plates 21, 31, and 32, respectively.

Also, the upper door 20 and the lower doors 31 and 32 may include a decor member connecting door liners, which define rear surfaces of the outer plates 21, 31, and 32 and the doors 20, 31, and 32, to each other.

In detail, the decor member may include a cap decor defining top and bottom surfaces of the doors 20, 31, and 32, and side frames 27 defining both side surfaces of the doors 20, 31 and 32.

Also, a door handle portion recessed to allow a user to open and close the door may be provided in the decor member.

In detail, the upper door 20 may include a door handle portion 201 providing by being depressed from a surface of the decor member defining the bottom surface.

Also, door handle portions 311 and 321 provided by being depressed from surfaces of the decor members 311 and 321 defining top surfaces of the lower doors 31 and 32 may be provided.

Each of the decor members and the door handle portions may be made of a plastic material. In detail, the decor member may be provided by injection-molding a plastic resin, and the door handle portion may be made of plastic rubber, but are not limited thereto.

Also, each of the decor members and the door handle portions may contain an inorganic antibacterial agent according to an embodiment. Thus, since the inorganic antibacterial agent are provided in the decor members or the door handle portions that are in frequent contact with the user's body, there is an effect of improving antibacterial properties and hygiene.

As described above, the decor members according to an embodiment may be components used to connect, seal, or decorate a space between an internal insulating material and an outer plate defining the outer appearance of the refrigerator.

Particularly, the decor members may be referred to as cap decors 25, 26, and 27 defining both the side surfaces, the top surfaces or the bottom surfaces of the doors 20 and 30, or the door handle portions 201, 301, 311, and 322 that open and close the doors 20 and 30, or a display cover that covers a display portion 6 disposed on the refrigerator.

Each of the decor members may include plastic, rubber, a film, or a metal. For example, the decor member may include an ABS resin, a SAN resin, an acrylic resin, a urethane resin, a silicone resin, a polypropylene resin, or rubber.

The decor member includes an inorganic antibacterial agent capable of killing microorganisms or bacteria. Thus, there is an advantage in that the decor member that is in frequent contact with the user's body may prevent contamination due to the microorganisms or the bacteria, thereby improving antibacterial properties and hygiene.

Hereinafter, the inorganic antibacterial agent according to an embodiment will be described in detail.

The inorganic antibacterial agent may include an antibacterial metal component having an oligodynamic effect that is called microbactericidal action. The antibacterial metal component may be directly applied, sprayed, coated, or deposited on a base material so as to be coupled so that the antibacterial metal component is contained in the decor member.

For example, after a surface of the decor member is modified through a chemical or physical etching process, a metal component may be directly coupled to the decor member by applying or spraying the inorganic antibacterial agent.

As another example, the inorganic antibacterial agent may be formed by bonding antibacterial metal components to an inorganic carrier.

In detail, the inorganic antibacterial agent is obtained by substituting the inorganic carrier such as zeolite or zirconium phosphate with metal ions having antibacterial properties such as silver (Ag), copper (Cu), manganese (Mn), zinc (Zn), and the like. Since the inorganic antimicrobial agent has a three-dimensional skeletal structure with fine pores, the inorganic antimicrobial agent has a large specific surface area and excellent antibacterial properties.

Also, metals that are toxic to the microorganisms are generally highly toxic to the human body, but the metals such as silver, copper, manganese, and zinc have an advantage in that the metals are harmless to the human body by using few metals with strong antibacterial activity and high stability.

In the inorganic antibacterial agent according to an embodiment, the metal component exhibiting the antibacterial properties, which is harmless to the human body, may be used, and the metal component having toxicity or influence on the human body may not be used.

For example, the metal component may include one or more components selected from the group consisting of silver (Ag), zinc (Zn), copper (Cu), manganese (Mn), mercury (Hg), tin (Sn), lead (Pb), cadmium (Cd), chromium (Cr), titanium (Ti), cobalt (Co), palladium (Pd), platinum (Pt), and gold (Au).

For specific example, as the metal component of the inorganic antimicrobial agent, other antimicrobial metals such as zinc, copper, mercury, tin, lead, cadmium, crop, titanium, cobalt, and the like may be used together with silver. However, since some metal components such as copper affect a color of the decor member due to a color change of the antibacterial agent itself due to the metal component when the metal components are excessively contained, the metal components may be used in an appropriate amount or less.

The antibacterial metal component may sterilize viruses, microorganisms, molds, and the like through the oligodynamic action. In detail, when bacteria or fungi are in contact with a surface of the metal, metal atoms may disturb the metabolism of the microorganisms, thereby killing the bacteria or the fungi. Also, the metal component activates oxygen so that generated active oxygen exerts a sterilizing effect. In addition, the antimicrobial metal component may be bound to a surface of the base material and then slowly eluted to induce bacterial death through penetration into cell membranes of strains. Thus, the antibacterial metal component may be contained in the decor member to kill viruses, bacteria and microorganisms, thereby improving the antibacterial properties and the hygiene.

The metal component may be contained at a content of about 0.01 parts by weight to about 30 parts by weight, more preferably about 0.1 parts by weight to about 15 parts by weight, based on 100 parts by weight of the inorganic antibacterial agent contained the metal component and the inorganic carrier.

More specifically, the content of silver (Ag) in the metal component may be about 0.1 parts by weight to 15 parts by weight, more preferably about 0.1 parts by weight to 5 parts by weight, based on 100 parts by weight of the inorganic antibacterial agent.

In other words, the content of silver (Ag) in the metal component may be about 0.1% by weight to about 15% by weight, preferably about 0.1% by weight to about 5% by weight, based on 100% by weight of the inorganic antibacterial agent.

If the content of the silver (Ag) is less than about 0.01% by weight, it is difficult to express sufficient antibacterial activity, and if it exceeds about 15% by weight, the inorganic antibacterial agent may discolor the decor member or deteriorate the physical properties.

The inorganic carrier may include one or more components selected from the group consisting of zeolite, zirconium phosphate, apatide, glass and silica.

In the inorganic antibacterial agent, as shown in Reaction Formula 1 below, the metal may be ion-exchanged on the inorganic carrier to form an inorganic carrier substituted with the metal ion.

$$M+Z \rightarrow MZ \qquad \text{[Reaction Formula 1]}$$

In Reaction Formula 1 above, M may be Ag, Zn, Cu, Hg, Sn, Pb, Cd, Cr, Ti, Co, Pd, Pt, or Au, and Z may be zeolite, zirconium phosphate, apatite, glass, or silica.

As described above, the inorganic antibacterial agent according to an embodiment may include a metal component having antibacterial properties and a carrier supporting the metal component.

In addition, the inorganic antibacterial agent according to another embodiment may include a metal component having antibacterial properties, a primary carrier supporting the metal component, and a secondary carrier supporting the primary carrier.

That is, two or more carriers supporting the metal component may be provided. Thus, a concentration of the metal component eluted from the decor member may be more stably controlled.

The primary carrier may include one or more components selected from the group consisting of zeolite, zirconium phosphate, apatide, glass and silica.

Also, the secondary carrier may include one or more components selected from the group consisting of zeolite, zirconium phosphate, apatide, glass and silica.

As a specific example, the primary carrier may primarily support the metal component, and the secondary carrier may secondarily support the primary carrier on which the metal component is supported.

In other words, the primary carrier on which the metal component is supported may be mixed with the secondary carrier to form pellets and then be mixed with a resin forming the decor member. The inorganic antibacterial agent may be able to secondarily support the metal component to more stably elute the inorganic antibacterial agent from the decor member.

The inorganic antibacterial agent may be contained at a content of about 0.01 parts by weight to about 30 parts by weight, preferably about 0.01 parts by weight to about 15 parts by weight, more preferably about 0.01 parts by weight to about 5 parts by weight, based on 100 parts by weight of the decor member.

When the inorganic antibacterial agent is contained at a content of less than about 0.01 parts by weight based on 100 parts by weight of the decor member, it may be difficult to express antibacterial performance, and when the inorganic antibacterial agent is contained at a content exceeding about 30 parts by weight based on 100 parts by weight of the decor member, there is a limitation that the metal component are excessively eluted from the decor member for a short time.

The inorganic antibacterial agent may be contained at a content of about 0.01% by weight to 5% by weight based on 100% by weight of an injection-molded product forming the decor member.

A mean particle diameter of the inorganic antibacterial agent may be, for example, about 1 µm to about 100 µm or about 1 µm to about 50 µm, preferably about 1 µm to about 20 µm. Within the above range, the concentration at which the inorganic antimicrobial agent is eluted from the decor member may be controlled within a set range.

The mean particle diameter of the base material may be measured by a general method used in the field to which the present disclosure belongs, for example, the mean particle diameter may be measured by using an intensity Gaussian distribution (Nicomp 380) in a dynamic laser light scattering method.

In the inorganic antibacterial agent according to an embodiment, the metal component may be supported on the inorganic carrier to gradually release the metal component supported on the carrier to the outside as time elapses. Thus, as the inorganic antibacterial agent is injected or applied to the decor member, the metal component may be gradually spread out the decor member surface as time elapses to protect the user from harmful bacteria for a long time.

The inorganic antibacterial agent according to an embodiment may be mixed during injection molding of the decor member and thus be integrally provided.

As a specific example, the inorganic antibacterial agent may be mixed with the resin forming the decor member, and a prototype of the decor member may be formed through an injection-molding process using the resin mixed with the inorganic antibacterial agent.

The inorganic antibacterial agent may contain about 0.1% by weight to about 20% by weight of metal ions having a mean particle diameter of about 0.1 micrometers to about 100 micrometers, and about 80% by weight to about 99.9% by weight of the inorganic carrier. The inorganic antibacterial agent may contain about 1% by weight to about 15% by weight of the metal ion, and about 75% by weight to about 99% by weight of the inorganic carrier.

Also, the inorganic antibacterial agent may be contained at a content of about 0.1% by weight to about 10% by weight, preferably about 0.1% by weight to about 5% by weight, or about 0.1% by weight to about 3% by weight of the total weight of the decor member. When the inorganic antibacterial agent is contained at a content of less than about 0.1% by weight in the decor member, it is difficult to improve the antimicrobial properties, and when the inorganic antibacterial agent is contained at a content of more than about 10% by weight in the decor member, the physical properties of the decor member may be deteriorated.

In the injecting of the inorganic antibacterial agent into the decor member, the inorganic antibacterial agent may be mixed with the resin forming the decor member, and the decorating member may be formed by injection-molding the mixture.

In this case, the inorganic antibacterial agent may use the mixed resin to form the prototype of the decor member in a master batch method. That is, the inorganic antibacterial agent may be formed in the form of a pellet and mixed at a desired amount with the resin constituting the decor member. In this case, since the inorganic antibacterial agent is contained in the entire decor member, the antibacterial effect may be longer, and the antibacterial effect may be improved.

In detail, the inorganic antibacterial agent in which the antibacterial metal is supported on the inorganic carrier may be mixed with a synthetic resin to prepare a pellet-type antibacterial master batch, and the master batch may be mixed with a synthetic resin forming a decor member to form a decor member. As a result, there is an advantage that the inorganic antibacterial agent is uniformly dispersed in the decor member, and thus, the antibacterial function is excellent.

As another example, the inorganic carrier according to an embodiment may be used instead of the synthetic resin to be mixed with the inorganic antibacterial agent for preparing the master batch.

That is, after the primary carrier is made in the form of the pellet in a manner of supporting the secondary carrier to prepare the master batch, a desired amount of pellets may be mixed with the resin constituting the decor member.

Specifically, the inorganic carrier (also referred to as the primary carrier) supporting the metal ions may be supported once more with the carrier (also referred to as the secondary carrier) having a support structure in which the metal ions are easily eluted to prepare the master batch and then may be mixed with the polymer resin constituting the decor member.

The secondary carrier may include one or more components selected from the group consisting of zeolite, zirconium phosphate, apatide, glass and silica.

Specifically, the secondary carrier may use zeolite, glass, or preferably thin glass beads that are capable of being broken by a pressure and heat. The secondary carrier may be subjected to the heat and the pressure during extrusion or injection molding of the polymer resin constituting the decor member, and thus, the structure of the secondary carrier may be collapsed. Thus, the inorganic carrier supporting the metal ions (the primary carrier) may be dispersed in the polymer resin. In this case, there is an advantage that the inorganic antibacterial agent is more uniformly dispersed in the decor member.

As another example, multiple extrusion may be used to form the inorganic antibacterial layer containing the inorganic antibacterial agent. In detail, the prototype of the decor member may be formed by the extrusion, and the prototype of the decor member may be placed in a mold to form an inorganic antibacterial layer using the resin mixed with the inorganic antibacterial agent.

In another example, a resin film in which the inorganic antibacterial agent is mixed in the prototype of the extrusion-molded decor member may be laminated on a surface of the prototype of the decor member to form the decor member having the antibacterial layer. In this case, the antibacterial layer may be formed only at a portion of the decor member, which is exposed to the outside to minimize the use of the inorganic antibacterial agent.

As another example, the surface of the decor member may be integrally provided by coating with the inorganic antibacterial agent. That is, the inorganic antibacterial layer may be formed on the decor member by spraying a coating solution containing the inorganic antibacterial agent on the surface of the decor member.

As another example, the surface of the decor member may be modified to form a protrusion, and the inorganic antibacterial agent may be contained in the decor member through the method, in which the inorganic antibacterial agent is directly coupled to the decor member.

In the decor member according to an embodiment, the silver (Ag) component may be contained at a content of about 100 mg/kg to about 400 mg/kg, preferably about 200 mg/kg to about 350 mg/kg. Within this range, the inorganic antibacterial agent may be stably eluted from the decor member.

The content of the silver component may be measured by a general method belonging to the technical fields of the present disclosure, for example, may be measured in an inductively coupled plasma mass spectrometry (ICP-MS) method. Specifically, a temperature may increase to about 190° C. using nitric acid and measured after pretreatment by being heated for about 20 min.

The decor member, for example, zirconium (Zr) may be contained at a content of about 700 mg/kg to about 1,000 mg/kg, preferably about 800 mg/kg to about 950 mg/kg. Within this range, the inorganic antibacterial agent may be stably eluted from the decor member.

In addition, the decor member according to an embodiment may be less than about 0.02 mg/L of the inorganic antibacterial agent according to an embodiment in an elution test measured according to an EPA method 200.8. Therefore, the decor member containing the inorganic antibacterial agent according to an embodiment may be controlled to stably elute the inorganic antibacterial agent.

What is claimed is:

1. A refrigerator comprising:
   a cabinet that defines a storage space; and
   a door configured to open and close at least a portion of the storage space,
   wherein the door comprises:
      an outer plate that defines an outer appearance of a front surface of the door,
      a door liner that defines a rear surface of the door, and
      a decor member that connects the outer plate to the door liner and that includes an inorganic antibacterial agent, the inorganic antibacterial agent comprising a metal component, a primary carrier that binds the metal component, and a secondary carrier that binds the primary carrier,
   wherein each of the primary carrier and the secondary carrier comprises at least one of zeolite, zirconium phosphate, apatite, glass, or silica, and
   wherein the decor member is made of a plastic material and includes a door handle portion that is recessed from one surface of the decor member.

2. The refrigerator according to claim 1, wherein the decor member comprises:
   an upper decor that defines a top surface of the door;
   a lower decor that defines a bottom surface of the door; and
   side frames that define side surfaces of the door.

3. The refrigerator according to claim 1, wherein the metal component comprises at least one of silver (Ag), zinc (Zn), copper (Cu), manganese (Mn), mercury (Hg), tin (Sn), lead (Pb), cadmium (Cd), chromium (Cr), titanium (Ti), cobalt (Co), palladium (Pd), platinum (Pt), or gold (Au).

4. The refrigerator according to claim 1, wherein the inorganic antibacterial agent comprises 0.1% to 15% of the metal component with respect to a weight of the inorganic antibacterial agent.

5. The refrigerator according to claim 1, wherein the inorganic antibacterial agent comprises 0.1% to 5% of a silver (Ag) component with respect to a weight of the inorganic antibacterial agent.

6. The refrigerator according to claim 1, wherein a mean particle diameter of the inorganic antibacterial agent is 1 μm to 100 μm.

7. The refrigerator according to claim 1, wherein a weight of the inorganic antibacterial agent is 0.01% to 5% with respect to a weight of the decor member.

8. The refrigerator according to claim 1, wherein the decor member comprises a silver (Ag) component, and
   wherein a content ratio of the silver component is 200 mg/kg to 350 mg/kg with respect to a weight of the decor member.

9. The refrigerator according to claim 1, wherein the outer plate is made of a metal material.

10. The refrigerator according to claim 1, further comprising a display disposed at the front surface of the door and configured to display an operation condition of the refrigerator or an operation state of the refrigerator,
    wherein the inorganic antibacterial agent is included in the display.

11. The refrigerator according to claim 1, wherein the inorganic antibacterial agent is included in an injection molding material of the decor member or coated on a surface of the decor member.

12. The refrigerator according to claim 1, wherein the decor member comprises:
    an upper decor that defines a top surface of the door; and
    a lower decor that defines a bottom surface of the door, and
    wherein lateral side surfaces of the outer plate are curved toward the door liner and cover side portions of the upper decor and the lower decor.

13. The refrigerator according to claim 1, wherein the door comprises a first side door and a second side door that are arranged laterally,
    wherein the door handle portion comprises:
       a first door handle portion recessed from a first side surface of the first side door, and
       a second door handle portion recessed from a second side surface of the second side door, the second side surface facing the first side surface, and
    wherein each of the first door handle portion and the second door handle portion includes the inorganic antibacterial agent.

14. The refrigerator according to claim 1, wherein the door comprises an upper door and a lower door that is disposed vertically below the upper door,
    wherein the door handle portion comprises:
       an upper side door handle portion recessed from a first side surface of the upper door, and
       a lower side door handle portion recessed from a second side surface of the lower door, the second side surface being disposed vertically below the first side surface and facing the first side surface, and
    wherein each of the upper side door handle portion and the lower side door handle portion includes the inorganic antibacterial agent.

15. The refrigerator according to claim 1, wherein the door comprises an upper door and a lower door that is disposed vertically below the upper door,
    wherein the decor member comprises:
       an upper top decor that is disposed at a top surface of the upper door; and
       a lower top decor disposed at a top surface of the lower door,
    wherein the door handle portion comprises:
       an upper door handle portion recessed from the top surface of the upper door, and a lower door handle portion recessed from the top surface of the lower door, and wherein each of the upper door handle portion and the lower door handle portion includes the inorganic antibacterial agent.

* * * * *